United States Patent [19]

Rusu et al.

[11] Patent Number: 4,774,425
[45] Date of Patent: Sep. 27, 1988

[54] MAGNETIC MEANS FOR REDUCING THE TORQUE REQUIRED TO DRIVE THE ROTOR OF AN ELECTRICAL GENERATOR

[75] Inventors: John Rusu; Alexis J. Rusu, both of Surfside, Fla.

[73] Assignees: Future Energy Source, Inc.; Electro-Magnetic Motors, Inc., both of San Juan, P.R.

[21] Appl. No.: 25,680

[22] Filed: Mar. 13, 1987

[51] Int. Cl.$^4$ ............................................. H02K 16/00
[52] U.S. Cl. ..................... 310/114; 310/154; 310/156; 310/254; 310/261
[58] Field of Search ............... 310/152, 154, 155, 156, 310/112, 113, 114, 181, 168, 171, 198, 208, 179, 254, 261, 268

[56] References Cited

U.S. PATENT DOCUMENTS

| | | | |
|---|---|---|---|
| 3,292,023 | 12/1966 | Kober | 310/156 |
| 3,426,224 | 2/1969 | Esters | 310/154 |
| 3,922,574 | 11/1975 | Whitley | 310/268 |
| 4,536,672 | 8/1985 | Kanayama et al. | 310/268 |

Primary Examiner—R. Skudy
Attorney, Agent, or Firm—Scrivener and Clarke

[57] ABSTRACT

In an electrical generator of the type wherein coils are driven through the magnetic fields of magnets, or vice versa depending on which are mounted on the rotor and which on the stator, the coils are attracted to the magnets and this attractive force requires a significant proportion of the torque which must be exerted on the rotor to drive it by an outside power source. The proportion of torque attributable to the attractive force of the magnets on the coils are reduced in accordance with the invention by the provision of sets of magnets one of each set being driven with the rotor and the other being fixed to the stator, the magnets being arranged with the same polarity so that they repel each other and exert a force on the rotor opposite to that exerted by the attractive forces of the first magnets on the coils, whereby the torque required to drive the rotor is reduced.

5 Claims, 2 Drawing Sheets

MAGNETIC MEANS FOR REDUCING THE TORQUE REQUIRED TO DRIVE THE ROTOR OF AN ELECTRICAL GENERATOR

This invention relates to electrical generators and more particularly to means for magnetically reducing the torque required to drive the rotor of an electrical generator.

In a generator of the type wherein a rotor carrying one of either coils, and magnets is driven relative to a stator carrying the other of the coils and magnets, the coils which include their cores, are attracted to the magnets. This attractive force can be of a large order and must be overcome by the external power source driving the rotor of the generator in order that the generator can produce an electrical power output. As an example, for conventional generators to produce an output equivalent of 50 horsepower, it heretofore has been necessary to supply input power on the order of 100 hp.

We have discovered that the input power requirements to drive a rotor of a generator for a given output can be substantially reduced by arranging sets of magnets on the rotor and stator, separate from the generator coils and magnets, whereby as the rotor is driven, the magnetic fields of the sets of magnets traverse each other, the polarities of the respective magnets being the same whereby the respective magnets of each set repel each other. By selecting sets of magnets having a repelling force equal to the attracting force of the first mentioned generator magnets, the input force or torque required to drive the rotor is only that necessary to overcome a retarding force proportional to friction. For balanced attractive and repelling forces, the input power requirements may be expressed by the following formula:

$$TR = (+x) + (-x) + F/0.5$$

where:
 TR = torque required;
 +x = the attractive force of a coil by a magnetic field;
 −x = the repelling force of the sets of magnets of like polarity; and
 F/0.5 = twice the force necessary to overcome friction.

Because the attracting and repelling forces cancel each other the input power need only be enough to overcome twice the friction force. For an output equivalent of 50 hp, the input power need only be on the order of 75 hp or less, which is a significant reduction representing a substantial saving in fuel needed to drive the generator.

The broad object of the present invention, therefore, is to provide in a generator of the type described sets of magnets arranged to repel each other and apply to the rotor a force opposite to the attractive force on the coils by their magnets, whereby the input power required to drive the rotor is reduced with respect to the power output of the generator.

Other objects and their attendant advantages will become apparent as the following detailed description is read in conjunction with the accompanying drawings wherein.

Figure 1:
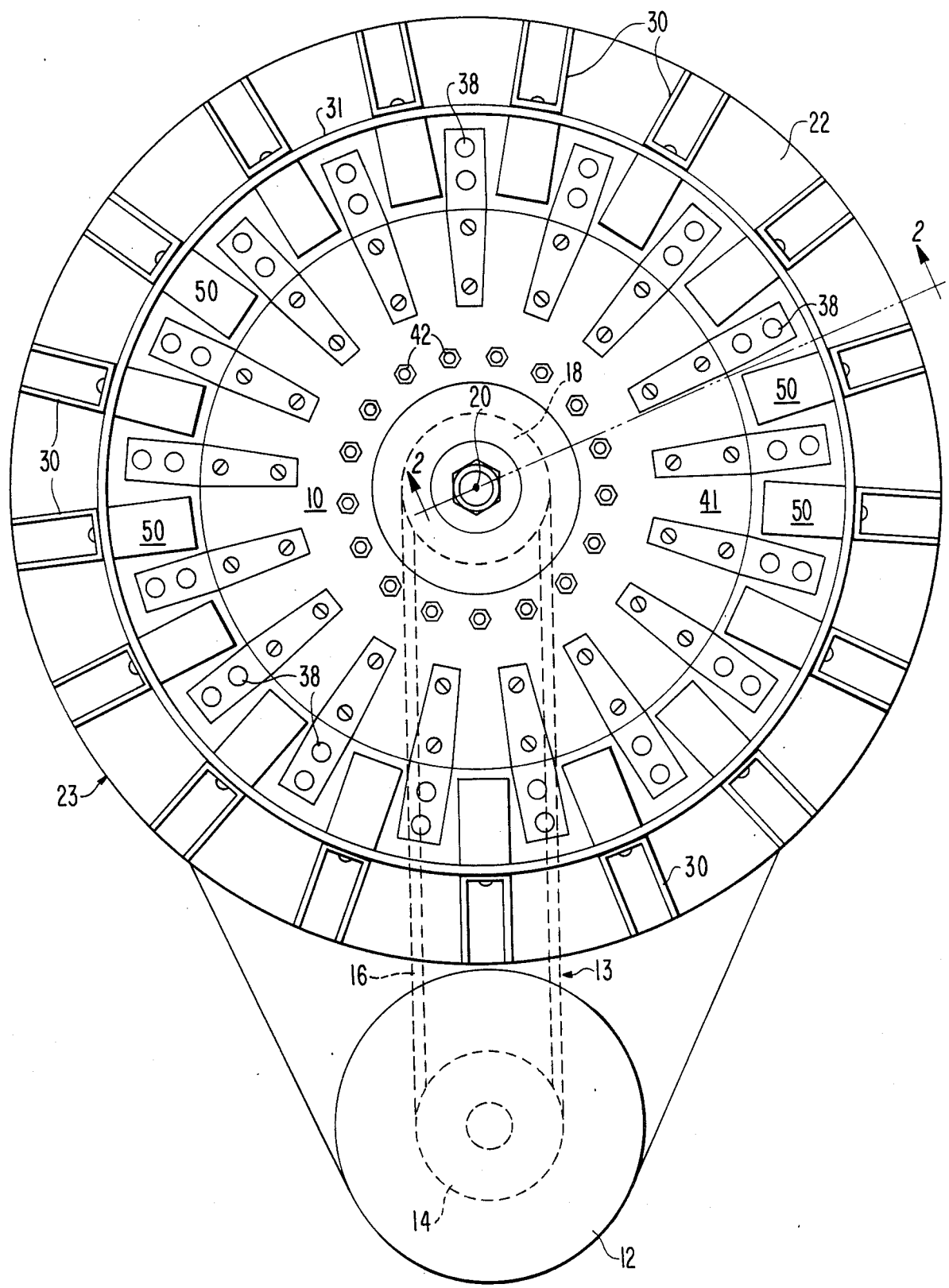
FIG. 1 is a plan view of a typical generator incorporating the invention.

Referring now to the drawings, the numeral 10 designates the rotor of an electrical generator. The rotor is driven by a power unit 12, which may be a steam turbine, diesel engine, etc., through a belt drive 13 wherein a driving pulley 14 on the unit 12 is connected by a belt 16 to a pulley 18 fixed to a shaft 20, rotatably mounted on a stationary annular plate 22 comprising part of a stator 23 of the generator. The rotor includes an annular plate assembly 24 which is centrally connected to the shaft 20 by a hub 26. Projecting radially outwardly beyond the rim of plate assembly 24 are a plurality of coils 28 which are equally angularly spaced about the axis of the shaft 20.

The stator 23 of the generator includes, in addition to the plate 22, a plurality of channel members 30 fixed to the plate 22 parallel to the shaft 20 and equal in number and angular spacing to the coils 28. The upper ends of the channel members 30 are interconnected for structural stiffness by a hoop-like component 31 and fixed to the inner faces of the channels are inwardly projecting first magnets 32, the north-south limbs 34, 36 of which are spaced apart a sufficient distance to enable the coils 28 to pass therebetween and in so doing traverse the magnetic fields thereof and have induced in the coils an electrical current which may be connected by conventional means (not shown) to slip rings 39 carried by the shaft 20.

What has been so far described is conventional. As those skilled in the art are aware, the coils 28 are wrapped around cores of passive magnetic material, usually soft iron, which are attracted by the magnetic fields of the first magnets 32, with the coils seeking rest positions between the limbs 34, 36 of the magnets. Where there are a large number of magnets and coils, the combined attractive forces on the coils by the magnets can be of a large order requiring considerable power to produce a torque great enough to overcome the attractive force in order to drive the rotor.

Those skilled in the art are aware that the coils could, if desired, be carried by the stator frame, and the magnets carried by the rotor plate assembly 24. Further, the magnets 32 can be permanent magnets, electro magnets or a combination of both.

In accordance with the invention, means are provided for reducing or eliminating the effect on the rotor of the attractive force of the magnets 32 on the coils 28. The means for accomplishing this comprises second and third magnets 38, 40, which are separate from the first magnets 32 forming part of the generator proper. The second magnets 38 extend radially outwardly from an annular plate 41, which is connected to the shaft 20 for rotation therewith, by means of bolts 42 connected to the hub 26 and surrounded by spacer sleeves 44. The third magnets 40 are fixed by suitable means to the channel members 30 of the stator in a position where, upon operation of the shaft 20 and the rotor, the fields of the second and third magnets traverse each other, the magnets 38, 40 being arranged that their polarities are the same, as indicated at N and S on the respective magnets 38, 40, whereby as these magnets approach each other they are increasingly repelled from each other. The magnets 38, 40 are selected that they exert a repelling force on each other of a predetermined value to exert on the rotor a force in opposition to the force exerted on the rotor by the predetermined attractive force of the first magnets 32 on the coils. Desirably, the attracting forces are equal and opposite whereby the formula set forth above applies and the torque required to rotate the rotor is only that necessary to overcome twice the retarding frictional forces.

Though the second and third magnets 38, 40 alone may be sufficient to neutralize the attractive force on the coil 28, it is within the purview of the invention to provide a fourth magnet 50 aligned with the third magnet 40, if this would provide a better balance and, in fact, it is within the purview of the invention to provide as many separate sets of repelling magnets as may be necessary to provide a force on the rotor to counter to whatever degree deemed desirable or necessary the force on the rotor attributable to the attractive force of the first magnets on the coils. It is also deemed within the purview of the invention that instead of equalizing the force exerted on the rotor by the attractive force of the first magnets on the coils, the repelling force of the second, and third magnets, or however magnets may be utilized, can be selected simply to reduce to a certain selected extent the torque required to turn the rotor shaft against the attractive forces on the coils.

Figure 2:
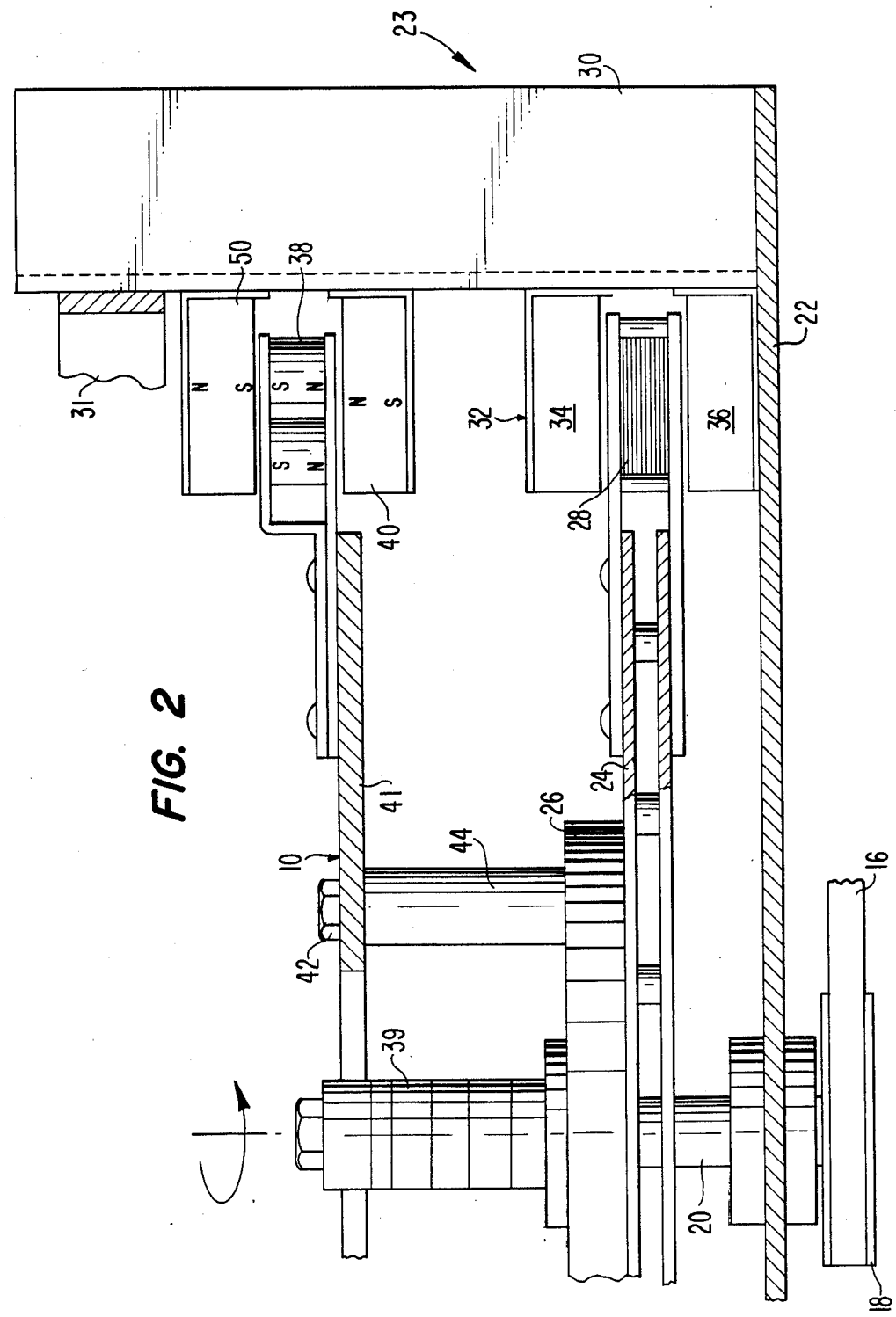
FIG. 2 is a vertical cross-sectional view taken substantially on the line 2—2 of FIG. 1.

The second and third magnets are equal in number and equally angularly spaced about the axis of the shaft 20. Preferably, the second and third magnets are equal in number to the coils 28 and first magnets 32 of the generator and are positioned the same radial distance from the axis of the shaft 20 as shown in FIG. 2. However, it is within the purview of the invention to have any suitable number of equally angular positioned second and third magnets at any radial distance from the axis of shaft 20 and, in fact, the second magnets could be carried by the same plate assembly 24 carrying either the magnets or coils of the generator. The second magnets would be spaced radially away from the generator coils or magnets, for example, radially inwardly thereof, and the third magnets could be carried on arms or an annular plate suitably fixed to the channel member 30.

The second, third, fourth, etc. magnets can be permanent magnets, electro-magnets, or a combination of both.

From the foregoing description, it can be seen that the invention is susceptible of a large variety of modifications and changes, without however, departing from the scope and spirit of the appended claims.

What is claimed is:

1. In combination with an electrical generator of the type including a rotor member mounted on a shaft, means carried by said shaft for exerting a torque thereon from an outside power source to operate said rotor member, and a stator member, one of said members carrying a coil and the other of said members carrying a first magnet for producing a magnetic field for inducing in said coil a current when said magnetic field and said coil are caused to traverse each other upon operation of said rotor member, said magnetic field exerting an attracting force on said coil of a predetermined value, the invention comprising a second magnet carried by said shaft for rotation therewith, said second magnet being spaced from said coil and said first magnet, a third magnet, and means fixing said third magnet to said stator member in a position wherein the fields of said second and third magnets traverse each other upon operation of said rotor member, the polarities of said second and third magnets being the same whereby said magnets repel each other, said magnetic field of said second and third magnets being selected that said second and third magnets exert a repelling force on each other of a predetermined value to exert on said rotor member a force in opposition to the force exerted on said rotor member by the predetermined attracting force of said first magnet on said coil.

2. The combination of claim 1, wherein said rotor member carries a plurality of one of said coil and said first magnet equally angularly spaced about an axis of said shaft, and said stator member carries a plurality of the other of said coil and said first magnet corresponding in number and angular spacing to the one of said coil and first magnet carried by said rotor member, and wherein a plurality of said second magnet are carried by said shaft equally angularly spaced about the axis of said shaft, and a plurality of said third magnet carried by said stator member equal in number and spacing to said second magnet.

3. The combination of claim 2, wherein said plurality of said second and third magnets are equal in number and in angular spacing to a plurality of said first magnet and said coil.

4. The combination of claim 3, wherein said first magnet and coil have a predetermined radial spacing from the axis of said shaft and said second and third magnets are axially spaced from said coil and said first magnet and have a radial spacing from the axis of said shaft substantially equal to the radial spacing of said first magnet and said coil.

5. The combination of claim 1, wherein the magnetic field of said second and third magnets are selected to exert a repelling force on said rotor member substantially equal to and in opposition to the force exerted on said rotor member by the predetermined attracting force of said first magnet on said coil.

* * * * *